United States Patent Office 3,267,136
Patented August 16, 1966

3,267,136
PROCESS FOR PRODUCING LEVULINIC ACID
Carlos Vincenty, Jesus Torres Lassalle, and Solomon Goodman, Rio Piedras, Puerto Rico, assignors to The People of Puerto Rico
No Drawing. Filed May 9, 1963, Ser. No. 279,295
5 Claims. (Cl. 260—528)

This invention relates to a method of making levulinic acid, and more particularly, to a method of making levulinic acid from a hexose, such as glucose, or another carbohydrate material, such as a ligno-cellulose, molasses, and sucrose, which will yield a hexose under the conditions of the reaction.

In the past, several processes have been proposed for the production of levulinic acid which involve the digestion of the hexose or hexose-yielding material with a digestion medium containing inorganic acids or acid salts plus a liquid which may consist of water or alcohols or a mixture of water and alcohol, and may contain other inert materials. By acid salt is meant a salt of an acid in which not all of the acidic hydrogen atoms have been replaced with metallic atoms. Examples of such salts are sodium hydrogen sulfate and sodium dihydrogen phosphate. Such acid salts are to be contrasted with normal salts in which all of the acidic hydrogen atoms have been replaced by metallic atoms.

The use of a digestion medium which contains acids and/or acid salts in a water solution has certain disadvantages in the production, and especially the isolation, of levulinic acid. It is customary to extract levulinic acid from the aqueous reaction medium in which it is produced by the use of substantially water-immiscible organic solvents in which levulinic acid is preferentially soluble. The aqueous media which have been proposed in the past have such a high affinity for levulinic acid that excessively large volumes of organic solvent must be used to extract the levulinic acid from them.

Furthermore, the acidic digestion media conventionally employed are destructive of levulinic acid at the high temperatures used in the digestion, so that the digestion must be terminated as soon as possible after the levulinic acid is formed to minimize the destruction of the levulinic acid.

Another disadvantage associated with the prior digestion media is that an efficient conversion of hexose to levulinic acid is obtained only when the concentration of the hexose or hexose-yielding material is low, thereby producing solutions of levulinic acid which are excessively dilute, thus entailing great expense in the extraction and concentration of the levulinic acid.

Still another disadvantage encountered in the use of the prior art digestion media is that because of the necessity, pointed out above, of using substantially water-immiscible organic solvents for extraction, the employment of solvents such as lower alcohols and lower ketones which are the best solvents for levulinic acid is precluded because these solvents have too high a solubility in the digestion media and extraction solvents which are of low solubility in water but which are poorer solvents for levulinic acid must be used, thereby increasing the costs of extracting and concentrating the levulinic acid.

We have found that these disadvantages may be overcome or minimized, and other advantages may be gained, by using an aqueous digestion medium which does not contain mineral acids or acid salts, but which does contain certain normal salts. Of critical importance in the process of the invention is the nature of the salts, and the proportion of the salts to each other and to the water.

These normal salts should be such as to supply to the solution the cation $Al^{+++}$, at least one of the cations $Na^+$ and $K^+$ and the anions $Cl^-$ and $SO_4^=$. The reason that such a digestion medium results in yields of levulinic acid which equal or surpass the acidic media of the prior art is not known for certain, but it is believed that it is related to the fact that when aluminum salts are dissolved in water, there are formed complex molecules of hydrated aluminum oxide which have the ability to bind other ions, both cations and anions. Thus, it is felt that the primary catalytic agent in the medium of the invention is a complex aluminum-containing molecule which is amphoteric in nature, the structure of this molecule being controlled by the presence of the chloride, sulfate and sodium and/or potassium ions.

The preferred salts for use in preparing the digestion medium of the invention are aluminum sulfate and sodium or potassium chloride, but it will be obvious that other salts may be employed to introduce the ions found to be necessary. For instance, a mixture of sodium or potassium sulfate and aluminum chloride may be used or even a single salt, a sodium or potassium alum. Moreover, one or more of the required ions may be supplied by one or more salts, the other ion of which is not one which is essential but the presence of which does not seriously affect the yield. Thus, the chloride ion may be supplied by such salts as zinc chloride or magnesium chloride and the sulfate ion by such salts as zinc sulfate, magnesium sulfate and ferrous sulfate. Sodium sulfate or potassium sulfate may be used to supply two of the ions essential to the medium, one being the sodium or potassium ion and the other being the sulfate ion.

It has been found that various mixtures of these salts dissolved in water are effective in producing levulinic acid when used as a digestion medium with ligno-cellulosic material or other hexose-yielding materials, but the best results are obtained when the concentration of salts, if expressed as grams of salt per gram of solution, is no less than 80% of that concentration which represents a saturated solution at the temperature of 30° C. The maximum concentration of salts is that concentration which represents a saturated solution of the salts in the digestion medium at the temperature at which the digestion is carried out. Thus it is not important that the mixture of water and salts, which comprises the digestion medium, be a homogenous liquid at room temperature. In fact, some of the most effective mixtures consist of several phases at room temperature, that is, liquid saturated with salts, and solid salt crystals. Reasonably good yields of levulinic acid have been obtained from sugar cane bagasse with a digestion medium containing 40 grams of water to 60 grams of salts (calculated as anhydrous salt), where any water of hydration of the salts was calculated as water. However, we have found that it is better to have no more salts present than will dissolve in the medium at 95° C. so that the reaction mixture may be removed from the reaction vessel easily, and we have found that subsequent processing of the reaction mixture is facilitated if the concentration of salts is limited to that concentration which represents a saturated solution of the salts in the final reaction mixture at a temperature of 70° C.

When the reaction mixture is to be extracted with a solvent which has a relatively low boiling point, it is preferred that the final reaction mixture be saturated, or nearly saturated, with salts at a temperature of 50° C., the preferred temperature for extracting the levulinic acid. It is possible to extract the levulinic acid at higher temperatures using higher boiling solvents, or by carrying out the extraction in a pressurized system to prevent the loss of solvent. Higher temperatures permit higher concentrations of salts which make the extraction more efficient. However, it has been found that a reaction medium which is saturated or nearly saturated with salts at 50° C. fulfills substantially the aims of this invention.

The relative proportion of the various types of salts is important. As indicated earlier, salts containing ions other than those which are essential my be added to achieve a special aim such as to decrease the cost of the reaction medium or to decrease its corrosive effect on reaction vessels. The concentration of chloride ion must be kept low when magnesium or zinc salts are present in any quantity, or some of the favorable effect of the salt mixture will be lost. The proportion of magnesium chloride or zinc chloride, individually or added together, should not exceed 25% of the total salt content because they decrease the efficiency of extraction. The medium should contain at least 1.9 grams of aluminum ion, at least 1.8 grams of chloride ion, at least 6.5 grams of sulfate ion and a minimum of 1.2 grams of sodium ion or 2.0 grams of potassium per 100 grams of digestion medium. We prefer to use no more than 12 grams of chloride ion per 100 grams of digestion medium. The concentration of total salts (calculated on anhydrous basis) has a preferred range of 25 to 50 grams per 100 grams of digestion medium but may be within the range of 18 grams to 50 grams per 100 grams of medium.

The digestion itself is carried out at temperatures over 100° C. To achieve these temperatures, it is necessary to carry out the digestion under superatmospheric pressure as is well known in the art. The time required for the digestion is dependent on the temperature and the composition of the digestion medium, higher temperatures requiring shorter times. For example, we have found that times of 15 minutes to 6 hours at temperatures of 145° to 210° C. are suitable when using mixtures of potassium aluminum sulfate, and sodium chloride. However, it is to be understood that the invention is not limited to these conditions, since the present type of digestion medium is effective over a much wider temperature range.

The proportion of digestion medium to hexose-yielding material is dependent on the nature of this material. Bagasse and wood fluor, being fibrous and containing solid lignins, require a greater proportion of reaction than does molasses. When digesting molasses or sugars or completely fluid hexose yielding materials, we have found that the ratio of digestion medium to hexose yielding materials should be at least 1.7 by volume. When digesting ligno-cellulosic materials, the ratio should be at least 4. The mixture must be sufficiently fluid to insure adequate mixing and heat transfer from the heating surfaces to the mixture. It will be understood that the amount of fluid needed will depend also, on the design of the reaction vessel.

After digestion has proceeded to the point that a maximum conversion of the starting material to levulinic acid has been effected, the levulinic acid is extracted with an organic solvent which is immiscible with the liquor or only slightly soluble therein. It is here that the principal advantage arising from the use of the digestion medium described above is realized. Not only does the concentrated salt solution constituting the digestion medium of the invention have a lesser affinity for levulinic acid than does the acidic solutions of the prior art but there can be used for extraction solvents which are better solvents for levulinic acid because they are only sparingly soluble in the new medium. Thus, the present digestion medium is not miscible with isopropanol, acetone or n-propanol, and it dissolves much less of other solvents, such as methyl ethyl ketone, butanol, and ethyl acetate, than do the usual aqueous digestion media. Acetone, isopropanol n-propanol and methyl ethyl ketone are preferred extraction solvents for levulinic acid because they have a higher affinity for levulinic acid than do other solvents. Apparently, the high concentration of salts in our digestion medium has a beneficial salting out effect on the organic solvents and on the levulinic acid, so that the amount of solvent needed to extract the levulinic acid is greatly reduced, no matter which solvent is used. Methyl ethyl ketone, acetone and propanol are more efficient than n-butanol, and improve the economy of extraction. These solvents of lower molecular weight cannot be used with the usual acid media because they are too soluble in aqueous acid.

We have found that the density and high salt concentration of our digestion medium are of particular advantage in the extraction step, accelerating the separation of the liquid phases and minimizing the formation of undesirable emulsions.

Extraction of levulinic acid on a small scale may be accomplished by stirring the final reaction mixture with extracting solvent in a vessel and permitting the organic and aqueous phases to separate. The organic phase is then decanted or drawn off and levulinic acid is recovered by evaporation.

For large scale operations, it is preferable to use countercurrent extraction wherein the reaction mixture and extracting solvent are flown in contact with each other in opposite directions in conventional apparatus.

In both instances, there will, of course, be employed only that amount of solvent which will insure the extraction of all of the levulinic acid present in the reaction medium and this can readily be determined by experimentation.

Humin-like by-products, in addition to the lignins present in ligno-cellulosic materials, are usually formed when hexose yielding materials are digested to produce levulinic acid. The humins—and the residual lignins, which are produced by our digestion medium are easily filtered off because they have a hard, granular form.

The following examples will further illustrate our invention but are not meant to limit the same.

*Example 1*

A mixture of aluminum sulfate, potassium chloride and water, was heated to 75° C. and mixed with bagasse. The proportions of the components were chosen so that, for 100 grams of dry bagasse, the final mixture contained 383 grams of anhydrous aluminum sulfate, 50 grams of potassium chloride and 966 grams of water. 75 grams of the mixture was sealed in a tubular iron reactor which was immersed in an oil bath, maintained at 165° C., for 3 hours. The reactor was then cooled, the contents stirred with methyl ethyl ketone, the phases allowed to separate, the upper organic phase decanted off and the levulinic acid recovered by evaporation.

There was produced 19.1 grams of levulinic acid per 100 grams of dry bagasse which represents approximately 53% of the theoretical yield based on the cellulose content of the bagasse.

*Example 2*

A mixture of aluminum sulfate, sodium chloride and water was heated to 50° C. and mixed with chopped bagasse. The proportions of the components were chosen so that, for 100 grams of dry bagasse, the final mixture contained 333 grams of anhydrous aluminum sulfate, 100 grams of sodium chloride and 966 grams of water. 75 grams of the mixture was sealed in a tubular iron reactor and immersed in an oil bath, maintained at 165° C., for 3 hours. The reactor was then cooled, the contents stirred with isopropanol, the phases allowed to separate, the upper organic phase decanted off and the levulinic acid recovered by evaporation.

There was produced 16.2 grams of levulinic acid per 100 grams of dry bagasse, about 45% of the theoretical yield based on the cellulose content of the bagasse.

In addition to the advantages pointed out above which result from the use of the digestion medium of the present invention, it has been found that this medium is less destructive of levulinic acid so that there may be digested a first batch of lingno-cellulosic material, the solids filtered off and then without extracting the levulinic acid, the filtrate may be used to digest a second bath of ligno-cellulosic material. By repeating this procedure, there is built up a concentration of levulinic acid in the digestion medium which has a very high value and the amount of solvent required to extract the levulinic acid is greatly decreased, thereby reducing the cost of extraction to a minimum.

What is claimed is:

1. A process for the production of levulinic acid comprising digesting in an aqueous digestion medium under pressure at a temperature above 100° C. a substance selected from the group consisting of a hexose and a material yielding a hexose under the conditions of digestion, said digestion medium having salts dissolved therein furnishing aluminum ions, chloride ions, sulfate ions and ions of at least one alkali metal selected from the group consisting of sodium and potassium, the aluminum content being at least 1.9% based on the weight of said medium, the chloride content being at least 1.8% based on the weight of said medium, the sulfate content being at least 6.5% based on the weight of said medium, and the alkali metal content being at least 1.2% based on the weight of said medium when only sodium is present, at least 2.0% when only potassium is present and when both sodium and potassium are present, the concentration of each being such that the sum of the percent of sodium divided by 1.2 and the percent of potassium divided by 2.0 is at least one, the total salts content of said digestion medium being from 18 to 50% based on the weight of said medium, said digestion medium containing no more than 25%, based on the total salt content, of salts selected from the group consisting of magnesium chloride, zinc chloride and mixtures thereof, extracting levulinic acid from said digestion medium with an organic solvent for said levulinic acid which is substantially immiscible with said medium, and recovering levulinic acid from said organic solvent.

2. A process as claimed in claim 1 in which the chloride content of said digestion medium is nor more than 12% based on the weight of said mixture.

3. A process as claimed in claim 1 in which the starting material is sugar cane bagasse.

4. A process as claimed in claim 1 in which said organic solvent is selected from the group consisting of methyl ethyl ketone, acetone, n-propanol and isopropanol.

5. A process as claimed in claim 1 in which the total salts content of said digestion medium is at least 80% of that of a saturated solution at 30° C.

References Cited by the Examiner

UNITED STATES PATENTS

| | | | |
|---|---|---|---|
| 2,015,375 | 9/1935 | Bomonti | 252—442 X |
| 2,206,311 | 7/1940 | Thompson | 260—528 |
| 2,684,981 | 7/1954 | Sherman | 260—526 |

LORRAINE A. WEINBERGER, *Primary Examiner.*

H. G. MOORE, *Examiner.*

I. R. PELLMAN, R. K. JACKSON, *Assistant Examiners.*